(12) United States Patent
Arai et al.

(10) Patent No.: US 7,982,690 B2
(45) Date of Patent: *Jul. 19, 2011

(54) DEFORMABLE MICROMIRROR DEVICE

(75) Inventors: Kazuma Arai, Hachioji (JP); Fusao Ishii, Menlo Park, CA (US); Yoshihiro Maeda, Hachioji (JP)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 783 days.

This patent is subject to a terminal disclaimer.

(21) Appl. No.: 12/005,501

(22) Filed: Dec. 26, 2007

(65) Prior Publication Data

US 2008/0158442 A1 Jul. 3, 2008

Related U.S. Application Data

(60) Provisional application No. 60/877,341, filed on Dec. 27, 2006.

(51) Int. Cl.
*G09G 3/00* (2006.01)
(52) U.S. Cl. ............ 345/32; 345/84
(58) Field of Classification Search .......... 345/32, 345/55, 87–89, 98–100, 103, 690, 84
See application file for complete search history.

(56) References Cited

U.S. PATENT DOCUMENTS

| | | | |
|---|---|---|---|
| 5,278,652 A | 1/1994 | Urbanus et al. | |
| 5,339,116 A | 8/1994 | Urbanus et al. | |
| 5,612,713 A | 3/1997 | Bhuva et al. | |
| 5,668,611 A * | 9/1997 | Ernstoff et al. | 348/771 |
| 5,673,060 A | 9/1997 | Blaxtan et al. | |
| 5,977,942 A * | 11/1999 | Walker et al. | 345/97 |
| 6,061,049 A | 5/2000 | Pettitt et al. | |
| 6,535,196 B2 * | 3/2003 | Walker et al. | 345/102 |
| 6,906,850 B2 | 6/2005 | Knipe | |
| 7,050,038 B2 | 5/2006 | Matsuda et al. | |
| 7,300,878 B1 | 11/2007 | Jiang et al. | |
| 2004/0155856 A1 * | 8/2004 | Richards et al. | 345/102 |
| 2006/0061559 A1 * | 3/2006 | King | 345/204 |
| 2008/0100822 A1 * | 5/2008 | Munro | 356/4.01 |

* cited by examiner

*Primary Examiner* — Ricardo L Osorio
(74) *Attorney, Agent, or Firm* — Bo-In Lin

(57) ABSTRACT

A micromirror device, which makes an image display with digital image data, comprises pixel elements each of which makes pulse width modulation for incident light depending on the deflection state of light and which are arranged in the form of an array. The array of the pixel elements is composed of B subsets each including pixel elements of $M_s$ (COLUMNs)×$N_s$ (ROWs) ($M_s$, $N_s$, and B are natural numbers). Each of the pixel elements has a mirror, and at least one memory cell. The memory cell has a transistor of an input gate capacity $C_t[F]$. Each memory cell is connected by a ROW line having a wiring resistance $R[\Omega]$, and a wiring capacity $C[F]$. When a gray scale display of 10 [bits] or more for each color is made with a color sequential display of $C_0$ colors, $M_s$, $N_s$, B, $C_t$, R, C, and $C_0$ have a relationship of $R*(C_t+C) < (1.63*10^{-5}*B)/[C_o*M_s*N_s*(M_s+1)]$.

24 Claims, 13 Drawing Sheets

DEFORMABLE MICROMIRROR DEVICE

CROSS REFERENCE

This application claims the benefit of priority by a previously filed U.S. Provisional Patent Application Ser. No. 60/877,341 filed on Dec. 27, 2006, the entire contents of which are incorporated by reference in this Application.

BACKGROUND OF THE INVENTION

1. Field of the Invention

The present invention relates to image display devices implemented with a spatial light modulator (SLM) includes a plurality of micromirrors. More particularly, this invention relates to the circuit configurations for controlling and modulating the SLM includes a deformable micromirror device.

2. Description of the Related Art

After the dominance of CRT technology in the display industry over 100 years, Flat Panel Display (noted as "FPD" hereinafter) and Projection Display have gained popularity because of the smaller form-factor and larger size of screen. Among several types of projection displays, the ones using micro-Spatial Light Modulators (SLMs) are gaining recognition by consumers because of high performance of picture quality as well as lower cost than FPDs. There are two types of a micro-SLM used for projection displays in the market. One is micro-Liquid Crystal Display (LCD) and the other is micromirror technology. Because a micromirror device uses un-polarized light, a micromirror device has an advantage on brightness over micro-LCD, which uses polarized light.

Even though there have been significant advances of the technologies implementing an electromechanical micromirror device as an SLM in recent years, there are still limitations and difficulties when it is employed to provide a high quality image. Specifically, when the images are digitally controlled, the image quality is adversely affected due to the fact that the images are not displayed with a sufficient number of gray scales.

An electromechanical micromirror device is drawing a considerable interest as an SLM. The electromechanical micromirror device consists of "a mirror array" arraying a large number of mirror elements. In general, the mirror elements ranging from 60,000 to several millions are arrayed on a surface of a substrate in an electromechanical micromirror device. Referring to FIG. 1A for an image display system 1 including a screen 2 is disclosed in a reference U.S. Pat. No. 5,214,420. A light source 10 is used for generating light energy for illuminating the screen 2. The generated light 9 is further collimated and directed toward a lens 12 by a mirror 11. Lenses 12, 13 and 14 form a beam columnator operative to calumniate light 9 into a column of light 8. A spatial light modulator (SLM) 15 is controlled on the basis of data input by a computer 19 via a bus 18 and selectively redirects the portions of light from a path 7 toward an enlarger lens 5 and onto screen 2. The SLM 15 has a mirror array includes switchable reflective elements 17, 27, 37, and 47 each comprising a mirror 33 connected by a hinge 30 and supported on a surface 16 of a substrate in the electromechanical mirror device as shown in FIG. 1B. When the element 17 is in one position, a portion of the light from the path 7 is redirected along a path 6 to lens 5 where it is enlarged or spread along the path 4 to impinge on the screen 2 so as to form an illuminated pixel 3. When the element 17 is in another position, the light is redirected away from the display screen 2 and hence the pixel 3 is dark.

Most of the conventional image display devices such as the devices disclosed in U.S. Pat. No. 5,214,420 are implemented with a dual-state mirror control that controls the mirrors to operate at a state of either ON or OFF. The quality of an image display is limited due to the limited number of gray scales. Specifically, in a conventional control circuit that applies a PWM (Pulse Width Modulation), the quality of the image is limited by the LSB (least significant bit) or the least pulse width as control related to the ON or OFF state. Since the mirror is controlled to operate in an either ON or OFF state, the conventional image display apparatuses have no way to provide a pulse width to control the mirror that is shorter than the control duration allowable according to the LSB. The least quantity of light, which determines the least amount of adjustable brightness for adjusting the gray scale, is the light reflected during the time duration according to the least pulse width. The limited gray scale due to the LSB limitation leads to a degradation of the quality of the display image.

Specifically, FIG. 1C exemplifies a control circuit for controlling a mirror element according to the disclosure in the U.S. Pat. No. 5,285,407. The control circuit includes a memory cell 32. Various transistors are referred to as "M*" where "*" designates a transistor number and each transistor is an insulated gate field effect transistor. Transistors M5 and M7 are p-channel transistors; while transistors M6, M8, and M9 are n-channel transistors. The capacitances C1 and C2 represent the capacitive loads in the memory cell 32. The memory cell 32 includes an access switch transistor M9 and a latch 32a, which is based on a Static Random Access switch Memory (SRAM) design. The transistor M9 connected to a Row-line receives a DATA signal via a Bit-line. The memory cell 32-written data is accessed when the transistor M9 that has received the ROW signal on a Word-line is turned on. The latch 32a consists of two cross-coupled inverters, i.e., M5/M6 and M7/M8, which permit two stable states, that is, a state 1 is Node A high and Node B low, and a state 2 is Node A low and Node B high.

The control circuit as illustrated in FIG. 1C controls the mirrors to switch between two states and the control circuit drives the mirror to oscillate to either an ON or OFF deflected angle (or position) as shown in FIG. 1A. The minimum quantity of light controllable to reflect from each mirror element for image display, i.e., the resolution of gray scale of image display for a digitally controlled image display apparatus, is determined by the least length of time that the mirror is controllable to hold at the ON position. The length of time that each mirror is controlled to hold at an ON position is in turn controlled by multiple bit words.

FIG. 1D shows the "binary time durations" in the case of controlling SLM by four-bit words. As shown in FIG. 1D, the time durations have relative values of 1, 2, 4, and 8 that in turn determine the relative quantity of light of each of the four bits, where the "1" is least significant bit (LSB) and the "8" is the most significant bit. According to the PWM control mechanism, the minimum quantity of light that determines the resolution of the gray scale is a brightness controlled by using the "least significant bit" for holding the mirror at an ON position during a shortest controllable length of time.

In a simple example with n bits word for controlling the gray scale, one frame time is divided into $(2^n-1)$ equal time slices. If one frame time is 16.7 msec, each time slice is $16.7/(2^n-1)$ msec.

Having set these time lengths for each pixel in each frame of the image, the quantity of light in a pixel which is quantified as 0 time slices is black (no the quantity of light), 1 time slice is the quantity of light represented by the LSB, and 15 time slices (in the case of n=4) is the quantity of light represented by the maximum brightness. Based on quantity of light being quantified, the time of mirror holding at the ON position during one frame duration is determined by each pixel. Thus, each pixel with a quantified value which is more than 0 time slices is displayed by the mirror holding at an ON position with the number of time slices corresponding to its quantity of light during one frame duration. The viewer's eye integrates brightness of each pixel so that the image is displayed as if the image were generated with analog levels of light.

For controlling deflectable micromirror devices, the PWM calls for the data to be formatted into "bit-planes", where each bit-plane corresponds to a bit weight of the quantity of light. Thus, when the brightness of each pixel is represented by an n-bit value, each frame of data has the n-bit-planes. Then, each bit-plane has a 0 or 1 value for each mirror element. In the PWM described in the preceding paragraphs, each bit-plane is independently loaded and the mirror elements are controlled according to bit-plane values corresponding to them during one frame. For example, the bit-plane representing the LSB of each pixel is displayed as 1 time slice.

SUMMARY OF THE INVENTION

A micromirror device according to one preferred embodiment of the present invention is a micromirror device for making an image display with digital image data, and comprises pixel elements, each of which makes pulse width modulation (PWM) for incident light depending on the deflection state of light and which are arranged in the form of an array. The array of the pixel elements is composed of B subsets each including pixel elements of $M_s$ (COLUMNs)× $N_s$ (ROWs) ($M_s$, $N_s$, and B are natural numbers). Each of the pixel elements has a mirror, and at least one memory cell. The memory cell has a transistor of an input gate capacity $C_t[F]$. Each memory cell is connected by a ROW line having a wiring resistance $R[\Omega]$, and a wiring capacity $C[F]$. When a gray scale display of 10 [bits] or more for each color is made with a color sequential display of $C_0$ colors in this micromirror device, the above described $M_s$, $N_s$, B, $C_t$, R, C, and $C_0$ have a relationship of $R*(C_t+C)<(1.63*10^{-5}*B)/[C_o*M_s*N_s*(M_s+1)]$.

A micromirror device according to another preferred embodiment of the present invention is a micromirror device for making an image display with digital image data, and comprises pixel elements, each of which makes pulse width modulation (PWM) for incident light depending on the deflection state of light and which are arranged in the form of an array. The array of the pixel elements is composed of B subsets each including pixel elements of $M_s$ (COLUMNs)× $N_s$ (ROWs) ($M_s$, $N_s$, and B are natural numbers). Each of the pixel elements has a mirror, and at least one memory cell. The memory cell has a transistor of an input gate capacity $C_t[F]$. Each memory cell is connected by a ROW line having a wiring resistance $R[\Omega]$, and a wiring capacity $C[F]$. When a gray scale display of $G_s$[bits] for each color is made with a color sequential display of $C_0$ colors in this micromirror device, the above described $M_s$, $N_s$, B, $C_t$, R, C, $C_0$, and $G_S$ have a relationship of $R*(C_t+C)<B*[60* C_o*(2^{G_s}-1)*M_s*N_s*(M_s+1)]^{-1}$.

A micromirror device according to a further preferred embodiment of the present invention is micromirror device for making an image display with digital image data, and comprises pixel elements, each of which makes pulse width modulation (PWM) for incident light depending on the deflection state of light and which are arranged in the form of an array. The array of the pixel elements is composed of B subsets each including pixel elements of $M_s$ (COLUMNs)× $N_s$ (ROWs) ($M_s$, $N_s$, and B are natural numbers). Each of the pixel elements has a mirror, and at least one memory cell. The memory cell has a transistor of an input gate capacity $C_t[F]$. Each memory cell is connected by a ROW line having a wiring resistance $R[\Omega]$, and a wiring capacity $C[F]$. In this micromirror device, the above described $M_s$, $N_s$, $C_t$, R, and C have a relationship of $\tau>[R*(C_t+C)*M_s*(M_s+1)*N_s]$ for a minimum display duration $\tau$[sec] of each of the pixel elements for the digital image data.

BRIEF DESCRIPTION OF THE DRAWINGS

FIG. 9B is a schematic showing the state of a change in the quantity of reflection light to projection optics when a mirror is controlled to be ON;

DESCRIPTION OF THE PREFERRED EMBODIMENTS

Preferred embodiments according to the present invention are described below with reference to the drawings.

First Preferred Embodiment

Figure 2:
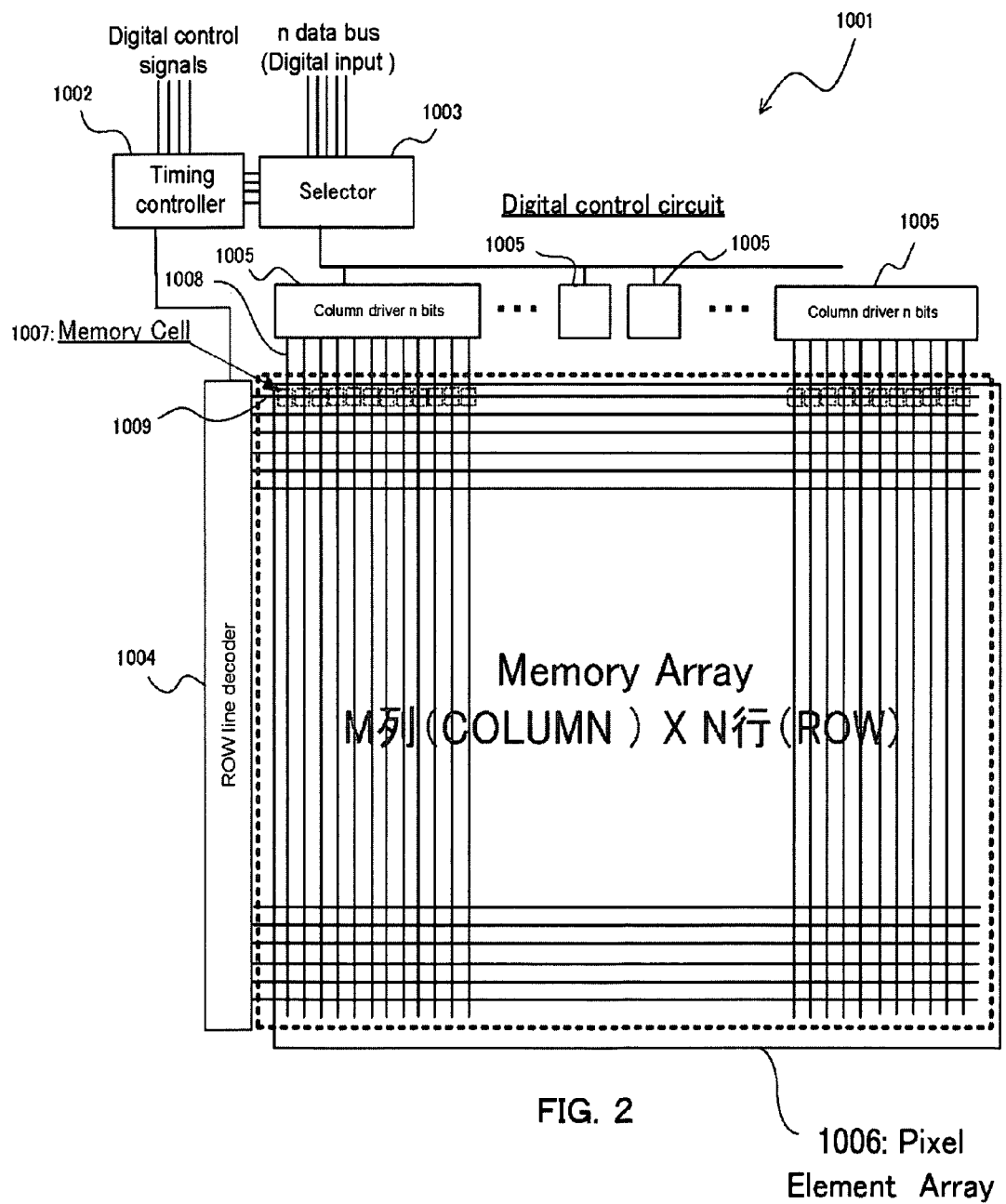
FIG. 2 is a schematic showing a simplified configuration of a micromirror device according to a first preferred embodiment.
Figure 3:
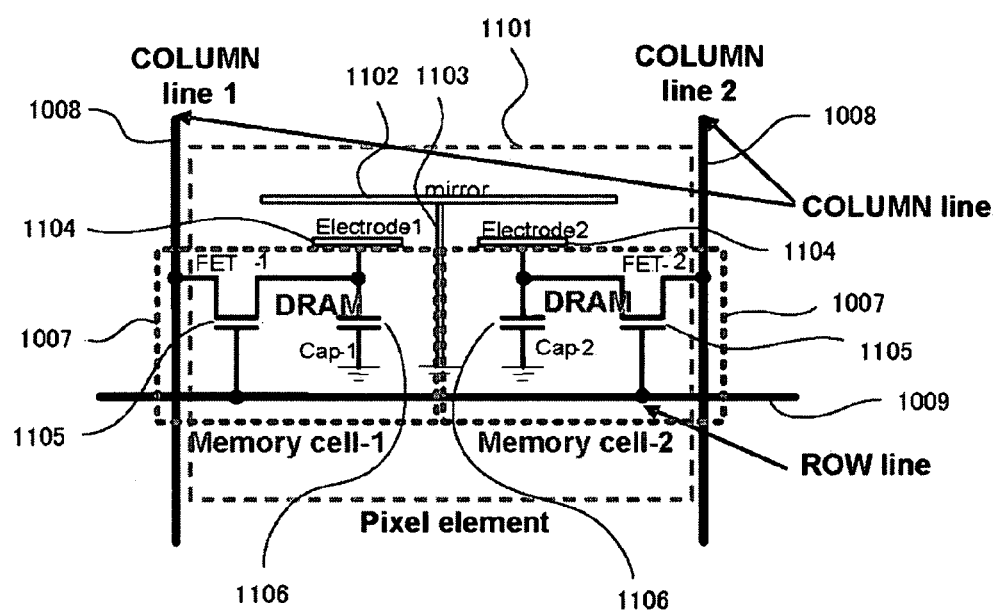
FIG. 3 is a schematic showing a simplified configuration of each pixel element of the micromirror device according to the first preferred embodiment.
Figure 4:
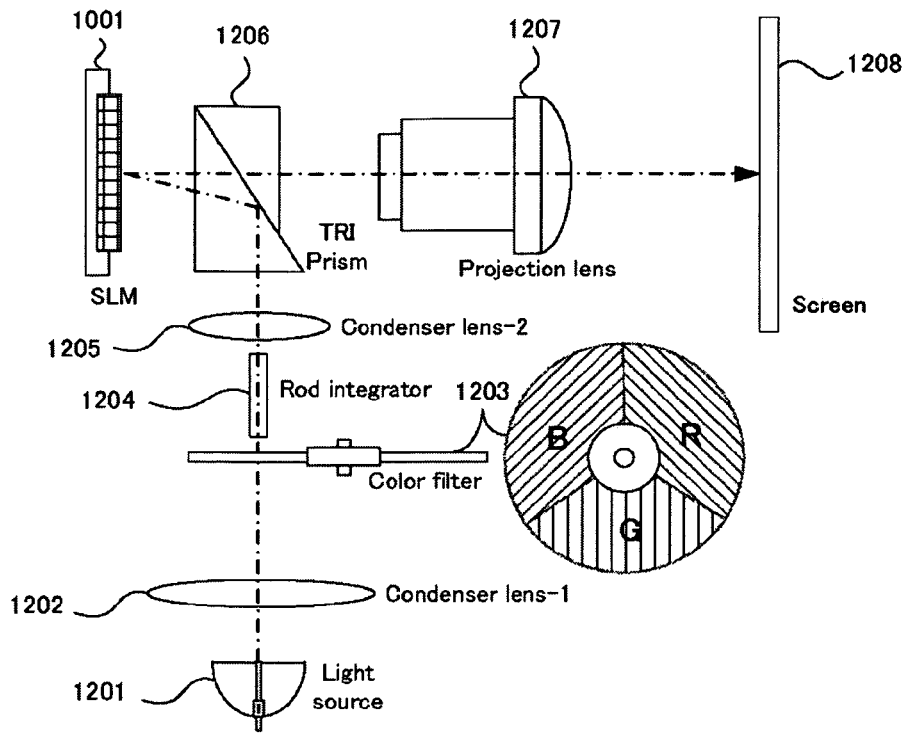
FIG. 4 is a schematic explaining simplified configurations of digital video systems (display devices) using different numbers of micromirror devices according to the first preferred embodiment.
Figure 4:
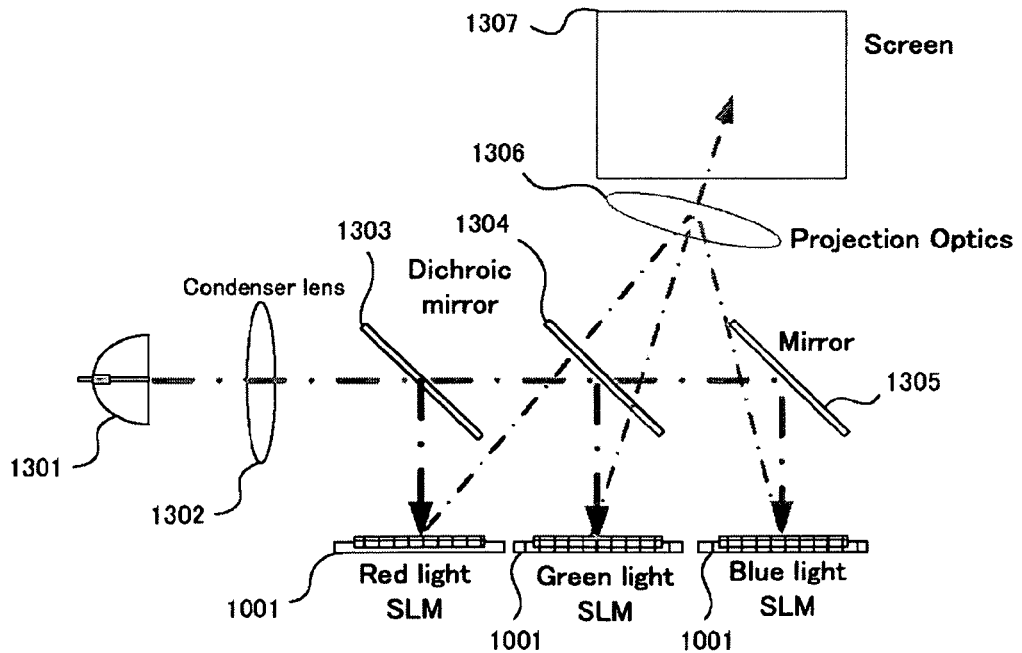
Figure 5:
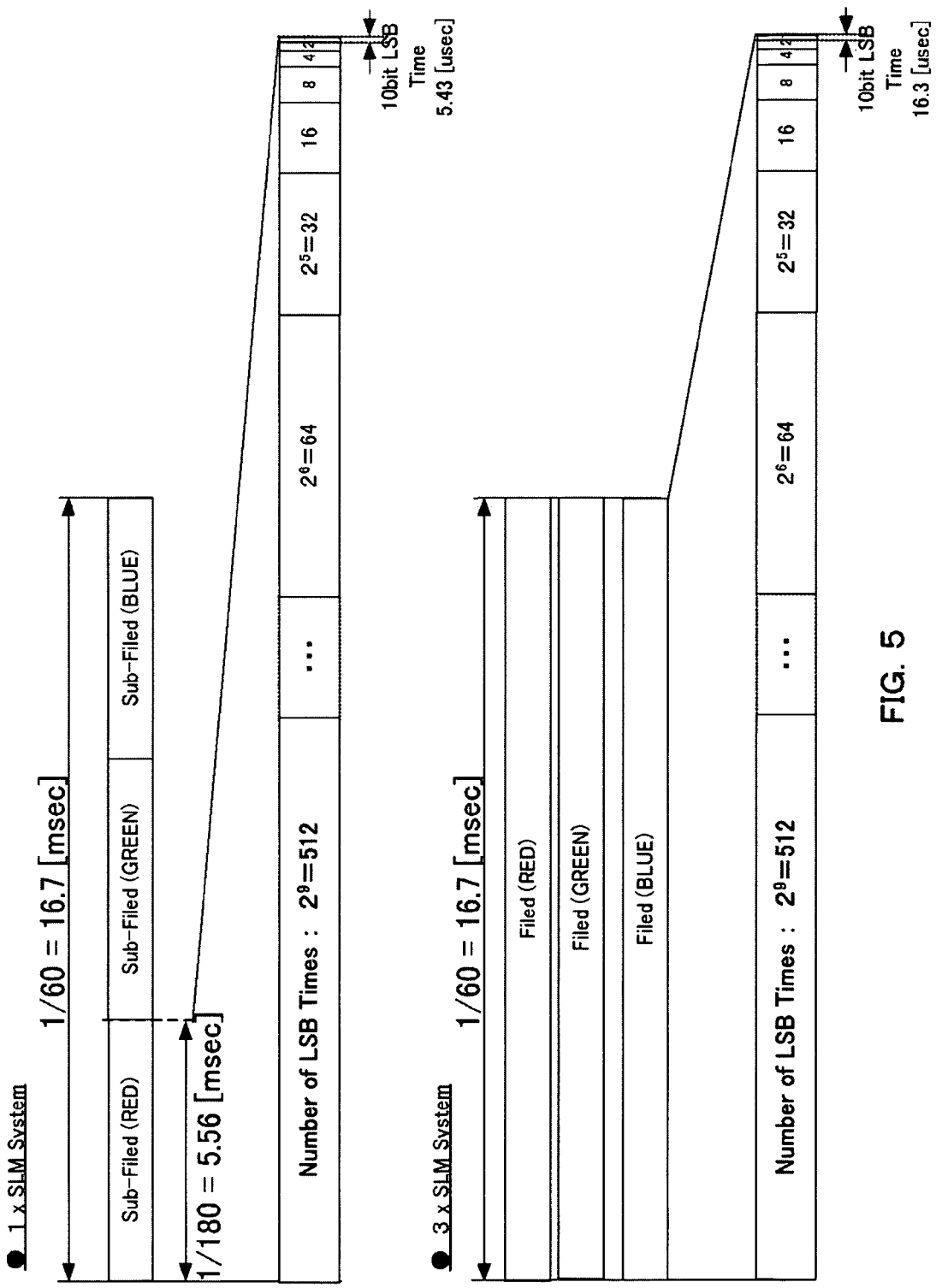
FIG. 5 is a schematic explaining a minimum display duration equivalent to the least significant bit of 10 bits for each color according to the number of micromirror devices used in the digital video system shown in FIG. 4, when an RGB color display of 10 bits is made in the micromirror device according to the first preferred embodiment.
Figure 6:
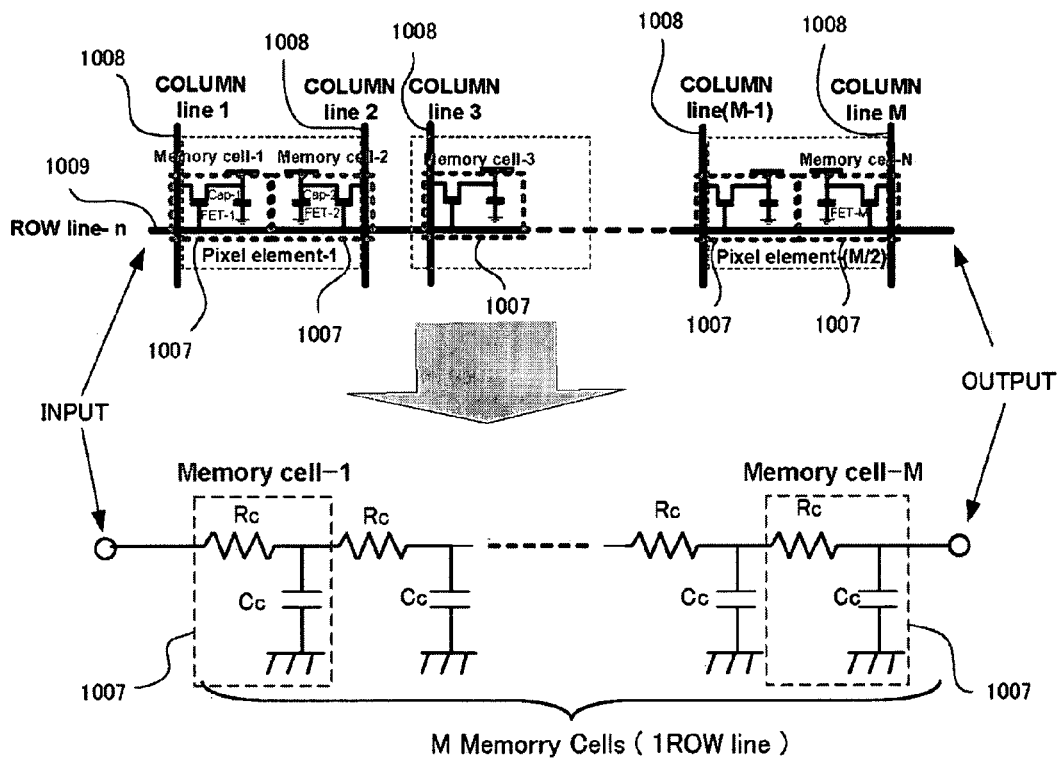
FIG. 6 is a schematic explaining a propagation delay time in a delay equivalent circuit of memory cells in 1 ROW line.

FIG. 2 is a schematic diagram for showing a simplified configuration of a micromirror device that includes a spatial light modulator (SLM) using the micromirrors according to the first preferred embodiment of the present invention. FIG. 3 is a schematic diagram for showing a simplified configuration of each pixel element of the micromirror device according to this preferred embodiment. FIG. 4 is a schematic diagram for explaining simplified configurations of digital video systems (display devices) using different numbers of micromirror devices according to this preferred embodiment. FIG. 5 is a schematic diagram for explaining a minimum display duration equivalent to the least significant bit of 10 bits for each color according to the number of micromirror devices used in the digital video systems shown in FIG. 4, when an RGB color display of 10 bits is made in the micromirror device according to this preferred embodiment. FIG. 6 is a schematic diagram for explaining a propagation delay time in a delay equivalent circuit of memory cells in 1 ROW line of the micromirror device according to this preferred embodiment.

As shown in FIG. 2, the micromirror device 1001 according to this preferred embodiment comprises a timing controller (timing control circuit) 1002, a selector (data selection circuit) 1003, a ROW line decoder 1004, a plurality of COLUMN drivers (column line driving circuits) 1005, and a pixel element array 1006. The pixel element array 1006 includes a plurality of pixel elements and these pixel elements are arranged in the form of an array together with other memory and control circuits electrically connected. The pixel element array 1006 has a memory array where a plurality of memory cells 1007 arranged in the form of an array of M (COLUMNs)×N (ROWs). In this figure, only the upper left memory cell is shown in denoted lines assigned with a reference numeral (1007) as a representative memory cell and it is understood that such memory cells are provided for each pixel element.

The timing controller 1002 controls the selector 1003 and the ROW line decoder 1004 according to a digital control signal received from an external control circuit not shown.

The selector 1003 transfers an n-bit digital data signal received from the external control circuit (not shown) via an n-bit data bus line. The n-bit signal is transferred to at least one COLUMN driver 1005 according to a control signal generated from the timing controller 1002 designating specific COLUMN drivers.

The COLUMN driver 1005 drives the COLUMN lines 1008 by outputting the n-bit digital image data signal transferred from the selector 1003 to the connected COLUMN lines 1008 of the pixel element array 1006. In this figure, only the leftmost COLUMN line is denoted with a reference numeral (1008) as a representative for the rest of the column lines operated in the same way as described.

The ROW line decoder 1004 drives an arbitrary ROW line 1009 of the pixel element array 1006 according to a control signal issued by the timing controller 1002. In this figure, only the topmost ROW line is denoted with a reference numeral (1009) as a representative for the rest of the row lines operated in an identical fashion as described for the topmost ROW line.

In the micromirror device 1001 configured in this way, display data corresponding to a designated display duration is transferred from the external control circuit (not shown) via the n-bit data bus line in this preferred embodiment. The n-bit data is sequentially transferred to the designated COLUMN drivers 1005 via the selector 1003. Upon completion of the transfer of new data to all of COLUMN drivers 1005, the ROW line decoder 1004 drives a desired ROW line 1009 according to an instruction of the timing controller 1002.

As shown in FIG. 3, a mirror 1102 is supported on a hinge 1103 for holding the mirror 1102 to allow for mirror deflection by applying voltages to the, electrodes (1 and 2) 1104. The memory cells (1 and 2) 1007 receive data for controlling the mirror 1002 to operate at a desired deflection state is arranged in each of the pixel elements 1101 as part of the pixel element array 1006. Each of the memory cells 1007 has a DRAM (Dynamic Random Access Memory) structure comprising an FET transistor (FET) 1105, and a capacitor (Cap) 1106. The structure of each of the memory cells is only shown as exemplary embodiment, and the structure of the memory should not limited to this particular configuration. Each of the memory cells 1007 can have a memory structure such as an SRAM (Static Random Access Memory) structure, etc. Each of the memory cells 1007 is connected to an electrode 1004, a COLUMN line 1008, and a ROW line 1009. With such a configuration, each of the pixel elements 1101 modulates incident light depending on the deflection state of the mirror 1102 according to data held in each of the memory cells 1007.

A ROW line 1009 driven by the ROW line decoder 1004 turns on the FET transistors 1105 implemented in memory cells 1007 according to particular circuit designs depending on the mirror control requirements. As a result, data is held in each of the memory cells 1007 according to the value of each data transferred to the COLUMN driver 1005, and a voltage according to each data is applied to the electrode 1004 connected to each of the memory cells 1007. The deflection state of the mirror 1102 is controlled according to a specific voltage based on the data held in each of the memory cells 1007 and held until the data stored in the memory cell is updated. To drive a different ROW line 1009 next, similar operations are repeated for the next designated ROW line 1009 after all of FET transistors 1005 in the driven ROW line 1009 are turned off.

This series of operations is performed for all the ROW lines 1009 shown in FIG. 2, whereby the micromirror device 1001 modulate and control the image display according to image data.

Figure 1A:
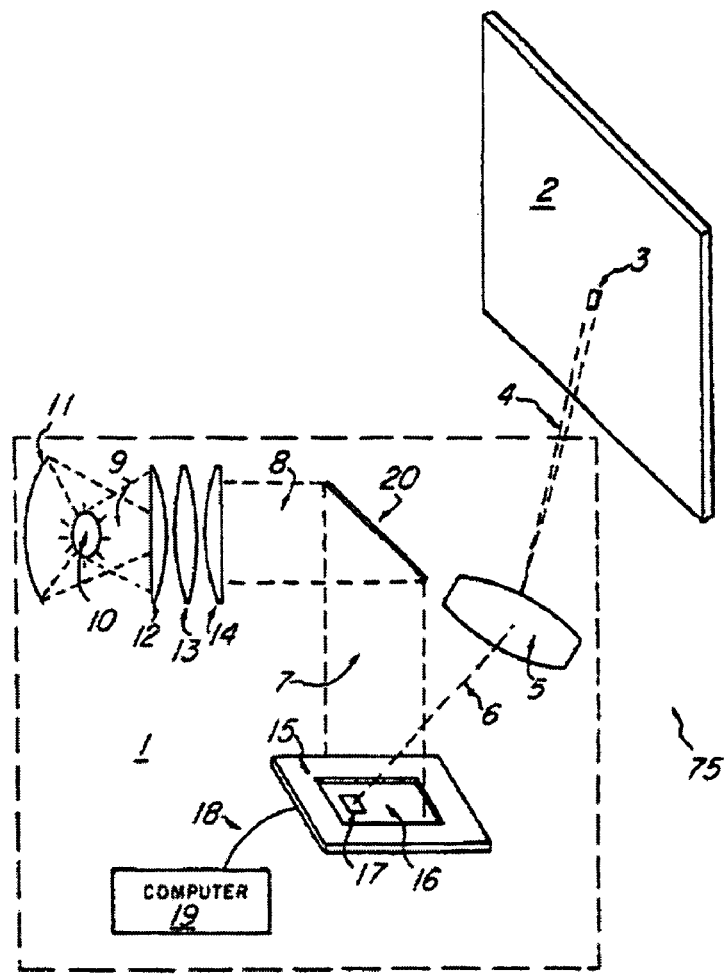
FIG. 1A is a schematic showing a conventional two-dimensional digital video system using a deformable micromirror device.
Figure 1B:
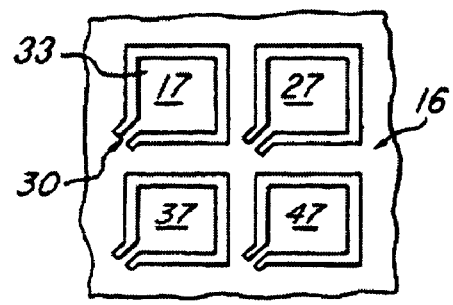
FIG. 1B is a schematic showing part of the deformable micromirror device shown in FIG. 1A.
Figure 1C:
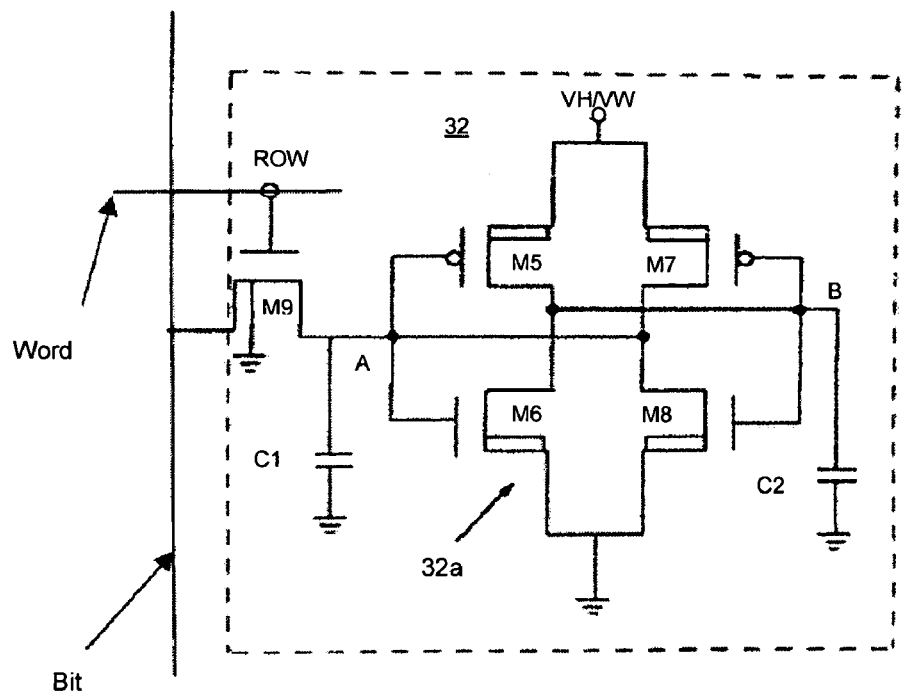
FIG. 1C is a diagram showing a conventional control circuit of a micromirror.
Figure 1D:
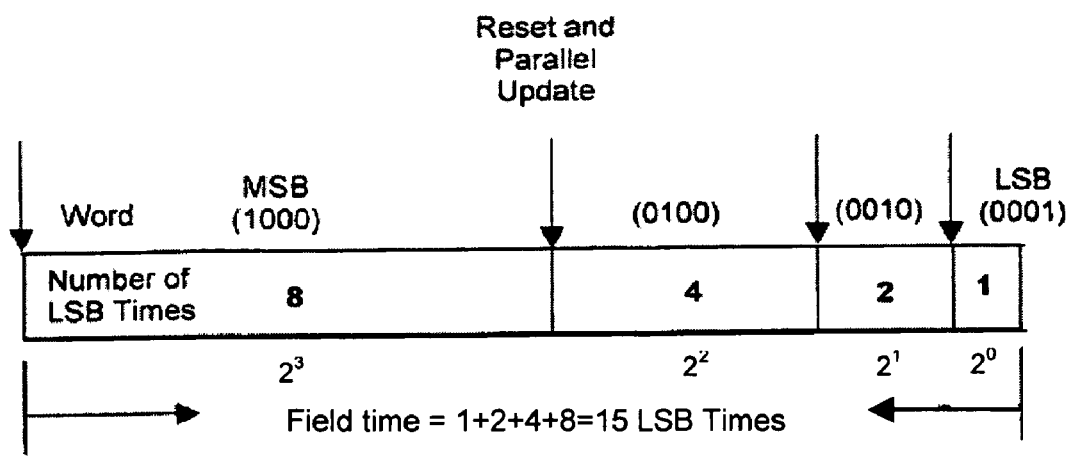
FIG. 1D is a schematic showing binary time intervals when a control is performed with 4-bit words.

The above described FIG. 1C discloses the SRAM structure implemented with the inverter circuits that includes a plurality of transistors (M5, M6, M7, and M8). When the above described DRAM structure is used, there is no need to drive the inverter circuits. Therefore, it is necessary to arrange a transistor to perform a switching operation. Therefore, a faster switching (ON/OFF) time of each transistor 1105 is arranged in each memory cell 1007 to allow the time for driving a memory cell 1007 arranged in each ROW line 1009. The time allow for driving each ROW line is determined according to a minimum display duration to be described below. Further improvement of circuit design with optimized performance will also be described later.

Each of the memory cells 1007 of the above described DRAM stores data by connecting one capacitor 1006 to one transistor 1105 as described above by storing an electric charge in the capacitor 1106. The electric charge decreases with time due to a leak current (dark current) of the connected transistor 1105. For this reason, the electric charge is lost and a malfunction of the mirror 1102 occurs unless the electric charge is periodically refilled (refreshed). Accordingly, a self-refresh must be provided with a self-refresh circuit that automatically refreshes the memory cells at optimum time intervals when a data access operation is not made to the DRAM for a required memory-refresh duration. A normal DRAM does not require a self-refresh until its voltage drops to a level at which data stored in the memory can no longer be properly recognizable. In the micromirror device using a micromirror like the present invention, the voltage in the control and memory circuits must be prevented from dropping to a voltage unable to hold the mirror to operate at a designated state.

If the required duration for refreshing interval is extended, or if the self-refresh is not necessary in the normal display duration, the power consumption at the time of the self-refresh can be reduced and the circuit can be simplified. The capacitance of the DRAM is deliberately set as to make its refresh interval longer than the longest display duration of the micromirror device, such as a display duration corresponding to MSB (Most Significant Bit) in controlling a gray scale, whereby a display operation that does not require the self-refresh can be performed as in the preferred embodiment as will be described below.

The exemplary embodiment described below is based on the assumption that the micromirror device 1001 is implemented with a micromirror device having the resolution of XGA, pixel elements 1101 are arranged as an array of 1024 (COLUMNs)×768 (ROWs).

In addition to the XGA Standard, recent display devices demand for an even a higher resolution such as full high-definition (1920×1080 pixels: hereinafter referred to as "Full HD") has been proposed, and progress has been made toward a higher resolution.

When the micromirror device 1001 according to this preferred embodiment is implemented as a micromirror device having the resolution of Full HD, 3840 (=1920*2) FET transistors 1105 must be turned on/off in driving of one ROW line 1009 according to the structure of the pixel element 1101 shown in FIG. 3. Accordingly, data of all the memory cells 1007 in the micromirror device 10001 must be updated to display one sub-frame according to image data, namely, FET transistors 1005 of 3840 (COLUMNs)×1080 (ROWs) must be turned on/off.

In the meantime, the demand for a higher gray scale of a display has been required as well as the demand for a higher resolution of a display device. There has been also an increasing demand for a higher gray scale. For example, a new I/F standard for an image display device, such as HDMI (High-Definition Multimedia Interface) 1.3, or the like was standardized to meet these demands. With HDMI 1.3, image data of 12-bit gray scale of each color can be transferred in an RGB color display.

The upper portion of FIG. 4 shows an exemplary display system to display an RGB color image with 10 bits image data for each color implemented for controlling the micromirror device 1001 implemented in a display system. The RGB color image display is controlled by one micromirror device that switches an RGB image display in time series. The minimum display duration equivalent to the LSB (Least Significant Bit) of 10 bits for each color results in 5.43($\approx$1/60*1/3*1/1023) [μsec] as shown in the upper portion of FIG. 5 (based on the assumption that the display duration of one frame, and the display duration of each color are 1/60 [sec], and 1/180 [sec] respectively).

The lower portion of FIG. 4 shows an alternate embodiment for displaying the RGB color image by applying 10 bits control for each color for controlling the micromirror device 1001 using 3 micromirror devices. Each of these three devices is respectively for displaying the RGB colors. the minimum display duration equivalent to the LSB of 10 bits for each color results in 16.3($\approx$1/60*1/1023) [μsec] as shown in the lower stage of FIG. 5 (based on the assumption that the display duration of one frame is 1/60[sec]).

The system shown in the upper portion of FIG. 4 is a generally referred to as a single-panel projection display system. In this system, light emitted from a light source 1201 is incident to a color filter 1203 via a condenser lens (condenser lens-1) 1202. The color filter 1203 is partitioned into 3 colors of RGB as shown in FIG. 4. The color filter of R, G or B is inserted in an optical path with the rotation of the color filter 1203, and transmits the light having a wavelength according to the color filter of an inserted color. The light that passed through the color filter 1203 is incident to a TIR prism 1206 via a rod integrator 1204 and a condenser lens (condenser lens-2) 1205, and the light reflected thereby is incident to a micromirror device 1001. The light selectively reflected by the micromirror device 1001 is incident to the TIR prism 1206. The light that passed through the TIR prism 1206 is projected on a screen 1208 by a projection lens 1207. In the system having such a configuration, a duration (one frame) for displaying one image is divided into sub-frames. In each sub-frame the light of one color among three colors of RGB is illuminated onto the micromirror device 1001. The micromirror device 1001 sequentially displays an image corresponding to each of the colors in synchronization with the illuminated light.

In contrast, the system shown in the lower stage of FIG. 4 is a generally referred to as a multi-panel projection display system having 3 micromirror devices. In this system, light emitted from a light source 1301 is split into light rays of RGB colors by 2 dichroic mirrors 1303 and 1304 after passing through a condenser lens 1302, and incident to micromirror devices 1001 (a red light SLM 1001, a green light SLM 1001, and a blue light SLM 1001), which respectively correspond to the RGB colors. The light of B is reflected on a mirror 1305 and incident to the blue light SLM 1001. The light selectively reflected by each of the micromirror devices 1001 is projected on a screen 1307 by projection optics 1306. In the system with such a configuration, the color light rays of RGB colors are respectively illuminated onto the micromirror devices 1001 during one frame period, and the micromirror devices 1001 sequentially display an image corresponding to each of the colors.

When an image is displayed in the Full HD resolution by applying a 10 bits image data for driving the pixel elements 1101 shown in FIGS. 2 and 3 with a display system shown in the upper portion of FIG. 4, 1080 ROW lines 1009 must be driven in the aforementioned duration of 5.43 [μsec]. Therefore, 1 ROW line 1009 must be driven in 5.03($\approx$5.43*10$^{-6}$/1080) [nsec].

In order to drive the above described 3840 FET transistors 1105 in such a small time, the switching speed significantly depends on the wiring resistance $R_{row}[\Omega]$ and the wiring capacity $C_{row}[F]$ of each ROW line 1009, which connects FET transistors 1105, in addition to the switching properties, such as an input gate capacity ($C_t$), etc., of an FET transistor 1105. Therefore, detail design and control of these operational characteristics and functional features of the circuits must be performed in order to achieve an image display of high resolution.

In light of these situations, this preferred embodiment discloses a method for adjusting the input gate capacity $C_t[F]$ of an FET transistor 1105, and the wiring resistance $R[\Omega]$ and the wiring capacity $C[F]$ of each memory cell 1007 in each ROW line 1009 to targeted ranges. The goal is to achieve a good balance between the resolution and the gray scale of the micromirror device 1001 while accomplish the display of the color images of high resolution.

The method for adjusting the input gate capacity $C_f[F]$ of an FET transistor 1105, and the wiring resistance $R[\Omega]$ and the wiring capacity $C[F]$ of each memory cell 1007 in each ROW line 1009 in order to achieve the minimum display duration $\tau[sec]$ is described.

The diagram in the upper portion of FIG. 6 shows a conceptual schematic of 1 ROW line 1009 when a memory cell 1007 has the DRAM structure shown in FIG. 3. When this ROW line 1009 is driven, all of FET transistors 1105 arranged in the ROW line 1009 are driven and turned on from the leftmost FET-1 to FET-M in FIG. 6. The voltage as controlled according to the image data of the COLUMN lines 1008 must be sequentially charged to the capacitors Cap-1 to Cap-M. The driving circuit for the ROW line 1009 is represented as a simple equivalent circuit, is a distribution constant circuit of $R_c$ and $C_c$ shown in the lower portion of FIG. 6. A propagation delay time in the delay equivalent circuit is approximated with the above $R_c$ and $C_c$ by the following equation.

$$\text{Delay time} = R_c * C_c * M * (M+1)/2 \text{ [sec]}$$

The values of the constants $R_c$ and $C_c$ are substantially determined according to the following property values of each memory cell 1007, and M is the number of memory cells 1007 per ROW line 1009.

$R_c \approx R$: Pattern resistance per a memory cell $C_c \approx (C+C_f)$

C: Pattern capacity per a memory cell $C_f$: FET Input gate capacity of a memory cell Accordingly, the above-described Delay time can be replaced with the following approximate equation.

$$\text{Delay time} = R*(C_f+C)*M*(M+1)/2 \text{ [sec]}$$

As described above, in driving 1 ROW line 1009, the image data is loaded into a new ROW line 1009 after all of FET transistors 1105 arranged in 1 ROW line are turned on with targeted image data loaded into memory cells 1007, and all the FET transistors 1105 are turned off. All of these operations are performed for all the ROW lines 1009. Accordingly, a time equal to the data loading time of one 1 ROW Line is required to load data into all the memory cells 1007 in 1 ROW line 1009 and the time is approximated as follows.

$$1 \text{ ROW Line Data Load time} = R*(C_f+C)*M*(M+1) \text{ [sec]}$$

Accordingly, a time of All ROW Line Data Load time is required to load desired image data into all of N ROW lines 1009, and that time duration is approximated as follows.

$$\text{All ROW Line Data Load time} = R*(C_f+C)*M*(M+1)*N \text{ [sec]}$$

Based on the above approximate equation, the wiring resistance $R[\Omega]$ and the wiring capacity $C[F]$ of a ROW line 1009 wired to each memory cell 1007, and the input gate capacity $C_f[F]$ of an FET transistor 1105, which are used to achieve the minimum display duration $\tau[sec]$ equivalent to the LSB, etc. of the desired gray scale, are determined by the following relational equation (1).

$$\tau > [R*(C_f+C)*M*(M+1)*N] \text{ [sec]} \qquad (1)$$

Accordingly, the wiring resistance $R[\Omega]$ and the wiring capacity $C[F]$ of the ROW line 1009, and the input gate capacity $C_f[F]$ of the FET transistor 1105 are adjusted to satisfy the above relational equation (1) in the wiring design of each memory cell 1007 and ROW line 1009 in the micromirror device 1001 according to this preferred embodiment, whereby a designated gray scale can be achieved in the micromirror device 1001 with a designated resolution.

The wiring resistance $R[\Omega]$ and the wiring capacity $C[F]$ of the ROW line 1009 have the following functional relationship in the semiconductor structure of each memory cell 1007. Therefore, these circuit characteristic parameters can be controlled by optimizing the following electrical resistivity $\varrho[\Omega m]$ of ROW line wiring, and relative permittivity of an inter-layer dielectric film of the ROW line wiring.

A relationship between the electrical resistivity $\varrho[\Omega m]$ and the resistance $R[\Omega]$ of a wire having a length of $L[m]$ and a cross-sectional area of $S[m^2]$ is as follows.

$$R = \varrho*(L/S)[\Omega m] \qquad (2)$$

A relationship between the capacitance $C[F]$ of a parallel plate, an area $A[m^2]$ of an electrode plate, and an interval $l[m]$ of the electrode plate is as follows.

$$C = \epsilon*(A/l) \text{ [F]} \qquad (3)$$

where a proportional constant $\epsilon$ (epsilon) is called the permittivity of an insulator, and its unit is $[F/m]$. Accordingly, $\epsilon$ varies depending on the substance of the material employed. Assuming that a vacuum permittivity is $\epsilon_0$, $\epsilon_0 = 8.85*10^{-12}$ $[F/m]$ and there is functional a relationship of $\epsilon = \epsilon_0 * \epsilon_r$ where $\epsilon_r$ is the relative permittivity of a corresponding substance.

In the micromirror device 1001 according to this preferred embodiment, a material having a low electrical resistivity $\varrho[\Omega m]$ is used as a wiring material of a ROW line 1009. Normally, the electrical resistivity $\varrho[\Omega m]$ is represented with a volume resistivity $\varrho20$ at a room temperature of 20° C. A material of Al the electrical resistivity $\varrho[\Omega m]$ of which is on the order of $2.65*10^{-8}$ $[\Omega m]$, Cu, Au or Ag the electrical resistivity $\varrho[\Omega m]$ of which is low, or an alloy containing these materials is desired to be used as the wiring material of a ROW line 1009.

Additionally, in the micromirror device 1001 according to this preferred embodiment, a material having a low relative permittivity $\epsilon_r[F/m]$ is preferably used as the inter-layer dielectric film of the ROW line 1009. The materials composed of $SiO_2$ or SiC, has a relative permittivity of which is 3.8[F/m] and can be selected as candidates of the inter-layer dielectric film. By doping an additive to these materials, the relative permittivity is further reduced. The material composed of SiOF doped with fluorine has the relative permittivity on the order of 3.6[F/m], and a material composed of SiOC doped with carbon has a relative permittivity on the order of 2.8[F/m].

In the micromirror device 1001 according to this preferred embodiment shown in FIG. 2, the following wiring resistance $R[\Omega]$ and wiring capacity $C[F]$ of a ROW line 1009, and the input gate capacity $C_f[F]$ of an FET transistor 1105 adjusted based on the above relational equation (1) in order to achieve the gray scale of 10 bits.

$$R*(C_f+C) < 1.63*10^{-5}/[C_o*M*N*(M+1)] \text{ [}\Omega F\text{]} \qquad (4)$$

where $C_0$ is the number of display colors of the micromirror device 1001 for making a display of the largest number of colors (for example, $C_0 = 3$ in the system shown in the upper stage of FIG. 4, and $C_0 = 1$ in the system shown in the lower stage of FIG. 4).

To achieve the resolution of Full HD by applying the micromirror device 1001 according to this preferred embodiment to the digital video system using one micromirror device shown in FIG. 1A, the above described parameters are represented by the following relational equation.

$$R*(C_f+C) < 3.41*10^{-16} \text{ [}\Omega F\text{]} \qquad (5)$$

(in the case of $\tau = 5.43*10^{-6}$ [sec], $M = 2*1920$, $N = 1080$)

At this time, the input gate capacity of an FET transistor of a 180-nm process is normally on the order of ten-odd [fF], and the wiring resistance of Al wiring in the same process is on the order of several tens [mΩ/m₂]. Additionally, the wiring capacity is less than 1[fF], and sufficiently smaller than the input gate capacity of the FET transistor. Moreover, the input gate capacity of the FET transistor is restricted by a wiring process.

Due to these design restrictions, it can be easily understood that the length and the cross-sectional area of a wiring pattern that determine the wiring resistance of the wiring pattern of a ROW line 1009 are important and must be carefully designed and manufactured within designated ranges. Furthermore, since the length of the wiring pattern significantly depends on the size of a pixel element of the micromirror device 1001, namely, a mirror size, the cross-sectional area of the wiring pattern is especially important.

Accordingly, the cross-sectional area of the ROW line of the micromirror device of a 5 μm-square mirror size in the newest process for achieving the high resolution of the micromirror device is roughly estimated as follows (in the case where the input gate capacity of the FET transistor is 1.0[fF]).

For Al wiring: cross-sectional area $S > 3.9*10^{-13}$ [m²]

For Cu wiring: cross-sectional area $S > 2.5*10^{-13}$ [m²]

(in the case of the electrical resistivity of Cu wiring $Q = 1.68*10^{-8}$ [Ωm]).

Additionally, the input gate capacity of the FET transistor is limited and depends on a wiring process as described above. Since the gate length of the FET transistor is dependent on the wiring process, the input gate capacity of the FET transistor decreases by improving the wiring process, and the operating voltage of the FET transistor also drops corresponding to the power supply voltage of a semiconductor device. Semiconductor devices manufactured with wiring processes described below are provided to operate with the following power supply voltages. Therefore, to achieve the high resolution/high gray scale in a display system implemented with the micromirror device 1001 according to this preferred embodiment using the wiring process of 0.25 [um] or smaller requires a mirror of reduced size, The mirror 1102 can be driven at a voltage applied to an electrode 1104, which is equal to or lower than the operating voltage of the FET transistor 1105. The following table lists the wiring processes and the corresponding power supplies voltages when the operating voltage of the FET transistor is equal to or lower than 3.3[V].

|  | Wiring process | | | | |
| --- | --- | --- | --- | --- | --- |
|  | 0.25 [um] | 0.18 [um] | 0.13 [um] | 90 [nm] | 65 [nm] |
| Power supply voltage: $V_d$ [V] | 3.3 | 3.3 | 3.3/ 2.5 | 3.3/ 2.5/ 1.8 | 3.3/ 2.5/ 1.8 |
| FET operating voltage: $V_o$ [V] | | | $\leq V_d$ | | |

Furthermore, in an actual design, the breakdown voltage of the FET transistor 1105 must be determined according to the driving voltage of the mirror 1102, and an FET transistor 1105 mounted within the mirror with a miniaturized size. It is necessary to select an FET transistor having a breakdown voltage to drive and hold the mirror 1102 at a FET transistor disposed on a far end form the voltage source in consideration of a voltage drop caused by the wiring resistance R[Ω] and the gate current of the FET transistor 1105. Namely, the breakdown voltage that is a voltage between a drain and a source of the FET transistor 1105 must be higher than the voltage to drive the mirror. The threshold voltage (gate threshold voltage) of the FET transistor 1105 must be lower than the voltage for holding the mirror. For example, a micromirror device 1001 with a mirror driving voltage set at ten volts and the voltage for holding the mirror 1102 at 5[V], the breakdown voltage of an FET transistor is 12[V] or higher, and the threshold voltage of which is 5[V] or lower when a voltage drop of 2.0[V] is caused by the wiring resistance.

Second Preferred Embodiment

The first preferred embodiment refers to the example where all the ROW lines are sequentially driven one by one. This preferred embodiment refers to a display device where a pixel element array is partitioned into subsets (groups), and data is concurrently loaded into the subsets.

Figure 7:
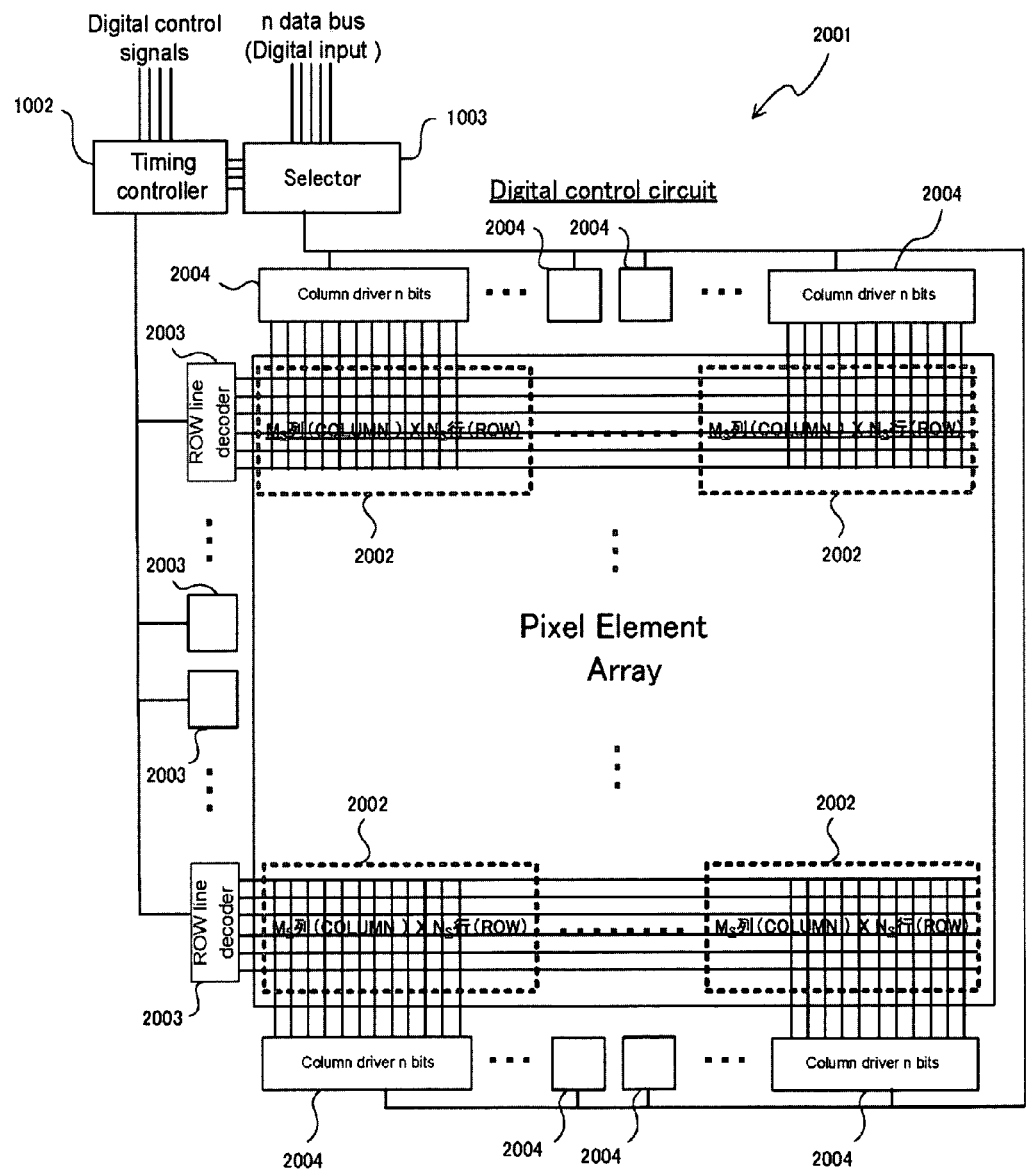
FIG. 7 is a schematic showing a simplified configuration of a micromirror device according to a second preferred embodiment.

FIG. 7 is a schematic showing a simplified configuration of a micromirror device according to the second preferred embodiment of the present invention.

The micromirror device 2001 shown in this figure differs from the micromirror device 1001 shown in FIG. 2 that the pixel element array is partitioned into a plurality of subsets 2002 as indicated by dotted lines in FIG. 7. Furthermore, one ROW line decoder 2003 and a plurality of COLUMN drivers 2004 are provided for each of the subsets. Each of the subsets 2002 has a memory array where a plurality of memory cells are arranged in the form of an array of Ms(COLUMNs)×Ns (ROWs).

With such a configuration, data can be concurrently loaded into the subsets 2002 by simultaneously driving one ROW line of each of the subsets 2002 after the data is transferred to all the COLUMN drivers 2004. Functional operations carried out in each of the subsets 2002 are similar to those described in the aforementioned first preferred embodiment. Alternately, one ROW line of a subset 2002 may be driven at timing different from those of the other subsets 2002 by using the timing controller 1002 shown in FIG. 7. As described above, data may be simply loaded into data-loadable subsets 2002 in a sequential manner according to an image data transfer to the micromirror device 2001 as a method for driving at least one subset 2002 at different timing. In another alternate method, the loading order of data bits of the image data for each subset 2002 may be changed for each subset 2002. If the loading order of data bits is changed, a data-loading interval varies by subset 2002. Therefore, a rate required to transfer image data to the micromirror device 2001 is the averaged transfer rate, and a rate required to transfer the image data in a load on peripheral circuits can be reduced. Additionally, for a projection display system implemented with this micromirror device 2001, it is expected to display an image with improved quality with reduced dynamic false contour, etc. The false image counter is a problem occurs at a boundary between subsets 2002 of the display screen of the projection display system in all of the above-described methods.

As a result, the number of ROW lines to be driven in the minimum display duration (τ) is reduced according to the number of subsets compared with the system described in the first preferred embodiment. The driving time required for each ROW line can be moderately increased.

According to this preferred embodiment, the pixel element array in the micromirror device 2001 is partitioned into a plurality of subsets 2002. Therefore, the relational equation (4), which is described in the first preferred embodiment, is transformed into the following relational equation (6).

$$R*(C_l+C)<(1.63*10^{-5}*B)/[C_o*M_s*N_s*(M_s+1)] \quad (6)$$

where B is the number of subsets. For ease of explanation, this preferred embodiment assumes that the subsets 2002 include an equal number of pixel elements. It is understood that the subsets 2002 may include different numbers of pixel elements and the equal number of pixel elements in each subset is just an example for convenience of explanation.

Assume a micromirror device has the pixel elements equally partitioned into four subset in the ROW direction to display an image with a Full HD resolution. Furthermore, the digital video system is implemented with one micromirror device shown in FIG. 1A. The above-described parameters are represented by the following relational equation (7).

$$R*(C_l+C)<2.18*10^{-14} [\Omega F] \quad (7)$$

(in the case of $\tau=5.43*10^{-14}$ [sec], B=4, $M_s=2*1920/4$, $N_s=1080$)

In this case, similar to the relational equation (5) described in the first preferred embodiment, according to the above relational equation (7) (when the input gate capacity of FET is 1.0[fF], the cross-sectional area of the ROW line wiring pattern for the micromirror device with a mirror size of 5-μm square applying a newest process is roughly estimated as listed in the equation below.

For Al wiring: cross-sectional area $S>6.1*10^{-15}$ [m$^2$]

For Cu wiring: cross-sectional area $S>3.9*10^{-15}$ [m$^2$]

(in the case of the electrical resistivity of Cu wiring $\varrho=1.68*10^{-8}$ [Ωm])

In this preferred embodiment, a plurality of subsets 2002 may be divided by partitioning a pixel element array either in the COLUMN direction or in the ROW direction, or partitioned in the COLUMN and the ROW directions respectively.

Additionally, if each ROW line of a subset 2002 is driven at timing different from those of other subsets 2002 as described above, the timing controller 1102 shown in FIG. 7 performs a timing control for loading image data for each subset 2002 to drive these subset at different time that may or may not have functional relationships among the times in driving these subsets. In this case, the timing controller 1002 shown in FIG. 7 can also control the operations of loading the image data into memory cells of adjacent pixel elements of subsets 2002 corresponding to these different timings. Moreover, the selector 1003 shown in FIG. 7 distributes the bit data of image data to the subsets 2002 in different sequential order according to the sequence of timing these subset are controlled to operate corresponding to the timing of the drive signals transmitted to each subset. Alternately, the selector 1003 shown in FIG. 7 may distribute 2 data blocks to the subsets 2002 according to different sequential orders when image data sent to a data block includes a data for controlling the mirror to operate in an oscillation state, and a data block that receives the image data does not include the image data for operating the mirrors in an oscillation state.

Furthermore, when each ROW line of a subset 2002 is driven at timing different from those of other subsets 2002 as described above, the micromirror device 2001 can be also configured so that at least two of the subsets 2002 are driven simultaneously and in an exemplary embodiment, the subsets 2002 driven at the same timing are not adjacent in the ROW direction. Alternately, the micromirror device 2001 can be also configured so that at least two of the subsets 2002 are driven at different timings and these two subsets 2002 driven with different timings are adjacent in the ROW direction.

The embodiment therefore discloses an image display system where the required number of ROW lines to operate in the minimum display duration (τ) is reduced when the pixel element array of the micromirror device 2001 are partitioned into a plurality of subsets and the time required to drive each ROW line of each of the subsets 2002 is properly controlled. The methods for controlling the micromirror device to control and adjust the minimum display duration (τ) are described separately to more clearly and fully describe the methods.

The above described preferred embodiments discloses an image display system implemented with a micromirror device having two deflection states for modulating the light in either at the ON and OFF states as exemplified in FIG. 8 described below.

Figures 10A, 10B:
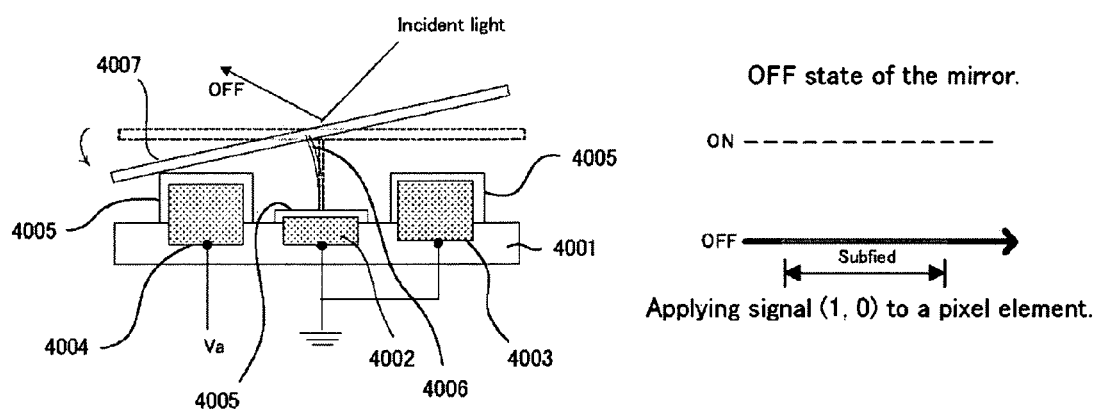
FIG. 10A is a schematic showing an OFF state of a mirror in a pixel element.
FIG. 10B is a schematic showing the state of a change in the quantity of reflection light to the projection optics when the mirror is controlled to be OFF.
Figure 11A:
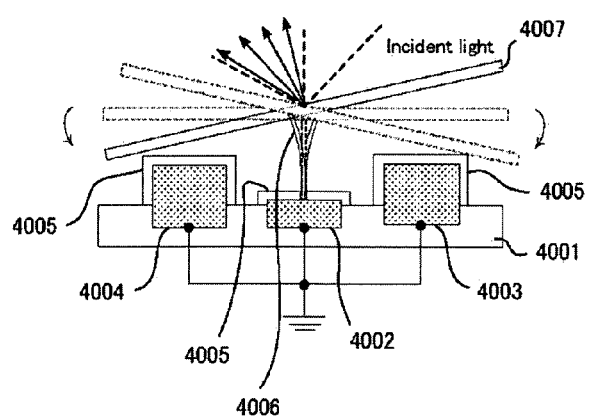
FIG. 11A is a first schematic showing the oscillation state of a mirror in a pixel element.
Figure 11B:
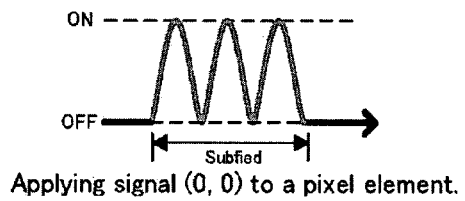
FIG. 11B is a first schematic showing the state of a change in the quantity of reflection light to the projection optics when the oscillation of the mirror is controlled.

In the meantime, there are also a micromirror device available that has a mirror oscillation state as exemplified in FIGS. 11A and 11B described below. The oscillation state is controllable as another mirror deflection state in addition to the deflection states of the mirror in two positions of ON exemplified in FIGS. 9A and 9B, and OFF exemplified in FIGS. 10A and 10B described below. When the micromirror device is controlled to operate in these deflection states, the quantity of minimum controllable reflection light deflected to the projection optics per unit time is reduced in the oscillation state. Therefore, the minimum display duration (τ) when for displaying images with the same gray scale display by projection the light with the oscillation mirror state increases according to the proportion of the quantity of reflection light in the ON state of the mirror. The time required to drive the micromirrors in each ROW line can also be adjusted accordingly. On the other hand, when the minimum display duration (τ) for controlling the micromirror device operated with the ON/OFF state is implemented for operating a micromirror device controllable to operate in the oscillation state, a higher gray scale display can be achieved.

Figure 8:
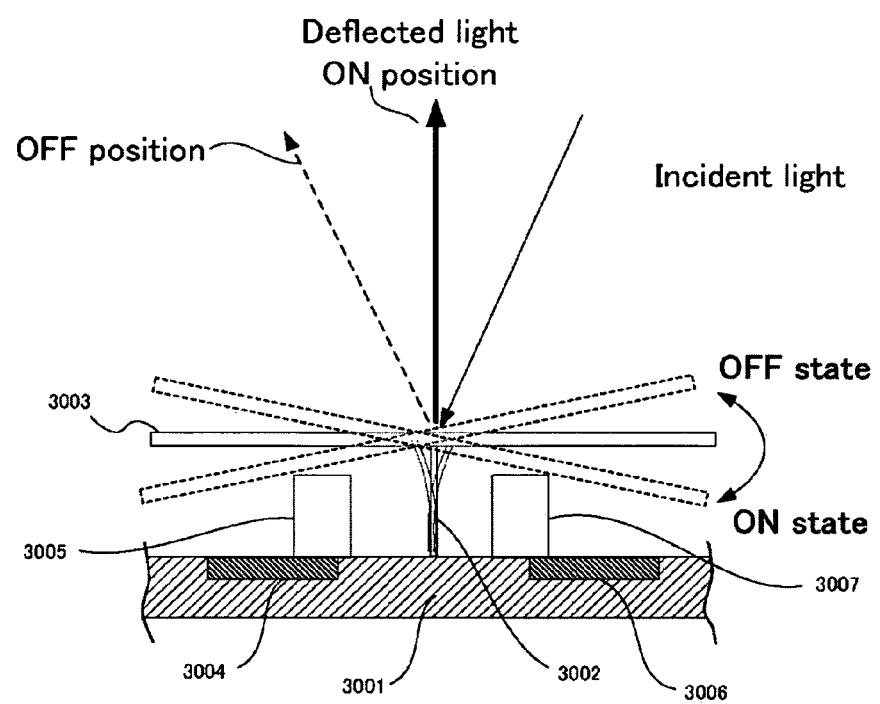
FIG. 8 shows an image display system implemented with a micromirror device having two deflection states for modulating the light in either at the ON and OFF states.

The micromirror device according to each of the above described preferred embodiments has a structure where each pixel element comprises a mirror 3003, which is supported with flexibility to freely tilt on a substrate 3001 via a hinge 3002 as shown in FIG. 8.

FIG. 8 shows a mirror that includes an OFF electrode 3004, an OFF stopper 3005, an ON electrode 3006, and an ON stopper 3007 are arranged in positions symmetrical with respect to the hinge 3002 on the substrate 3001.

The OFF electrode 3004 draws the mirror 3003 with a coulomb force applied with a predetermined voltage to tilt the mirror 3003 to a position with the mirror contacts the OFF stopper 3005. In this OFF position, the light incident to the mirror 3003 is reflected to the optical path along an OFF direction away from the optical axis of the projection optics.

In contrast, the ON electrode 3006 draws the mirror 3003 with a coulomb force applied a predetermined voltage to tilt the mirror 3003 to a position with the mirror contacts the ON stopper 3007. resulting this ON position, light incident to the mirror 3003 is reflected to the optical path along an ON direction align with the optical axis of the projection optics.

The OFF capacitor (Cap-1, 1106) shown in FIG. 3 is connected to the OFF electrode 3004, and further connected to COLUMN and ROW lines via a transistor. In the meantime, the ON capacitor (Cap-2, 1106) shown in FIG. 3 is connected to the ON electrode 3006, and further connected to COLUMN and ROW lines via a transistor. With the circuit connection as shown, the signal transmitted on a ROW line therefore controls the ON/OFF states of the transistor.

Specifically, the deflection state (ON/OFF state) of the mirror of each pixel element in a ROW line is individually controlled. The mirror deflection is controlled by simultaneously selecting a series of pixel elements in an arbitrary ROW line, and by controlling an electric charge/discharge to/from the OFF and the ON capacitors by COLUMN and ROW lines.

In the meantime, in the oscillation state described above, an electric charge stored in the ON and the OFF capacitors is discharged from a pixel element when the mirror in that pixel element is deflected to the ON or the OFF state. The Coulomb force applied between the mirror 3003 and the electrode 3006 or 3004 terminates. The elastic restoring force asserted by the hinge 3002 causes the mirror 3003 to move in an opposite direction until the mirror reaches the stopper on the opposite side. Since a there are no voltages applied to the opposite electrode, i.e., either the electrode 3004 or 3006, the mirror 3003 repeats the above movement by moving to the opposite stopper thus oscillates between two opposite stoppers as shown in FIGS. 11A and 11B to be described below. The oscillation may be stopped by applying a voltage to either of the ON or OFF electrodes.

FIGS. 9A, 10A, 11A, and 12A show the micromirror device wherein each pixel element has a structure with the electrodes servers the function also as a stopper. In this pixel element, a hinge electrode 4002, and two address electrodes 4003 and 4004 are provided on the top of a substrate 4001, and each of the electrodes is covered with a dielectric layer 4005. An elastic hinge 4006 penetrates through the dielectric layer 4005 and connected to the hinge electrode 4002. The mirror 4007 is supported on an elastic hinge 4006 with a flexibility to freely tilt via the elastic hinge 4006. Note that the hinge electrode 4002 is grounded.

FIG. 8 shows the ON capacitor (Cap-2) exemplified in FIG. 3 is connected to the address electrode 4003 and the OFF capacitor (Cap-1) exemplified in FIG. 3 is connected to the address electrode 4004, and the address electrodes are respectively connected to COLUMN and ROW lines via transistors. The deflection state of the mirror of each pixel element is individually controlled as described below.

Figure 9A:
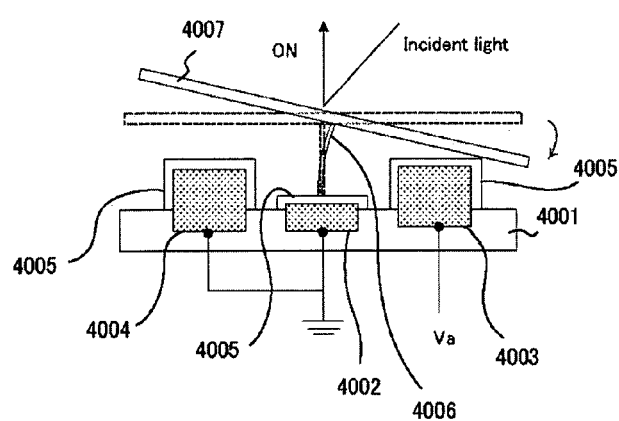
FIG. 9A is a schematic showing an ON state of a mirror in a pixel element.
Figure 9B:

The mirror 4007 is controlled to operate in an ON state with the pixel element shown in FIGS. 9A and 9B, a signal (0,1) is applied to the address electrodes 4004 and 4003 of pixel element respectively. Specifically, a voltage of $V_a[V]$ is applied to the address electrode 4003, and a voltage of 0[V] is applied to the address electrode 4004 as shown in FIG. 9A. As a result, the mirror 4007 is drawn by a coulomb force to move to the direction of the address electrode 4003 to which the voltage of $V_a[V]$ is applied. The mirror moves and tilts to a position until the mirror touches the dielectric layer 4005 of the address electrode 4003. As a result, incident light is reflected toward the projection optical path by the mirror 4007. FIG. 9B is a timing diagram for showing the change of the intensity of reflection light to the projection optics when the mirror 4007 is controlled to operate in the ON state.

To control the mirror 4007 to be OFF, a signal (1,0) is applied to the pixel element. Specifically, the voltage of $V_a[V]$ is applied to the address electrode 4004, and the voltage of 0[V] is applied to the address electrode 4003 as shown in FIG. 10A. As a result, the mirror 4007 is drawn by a coulomb force in the direction of the address electrode 4004 to which the voltage of $V_a[V]$ is applied. The mirror moves and tilts to a position until the mirror touches the dielectric layer 4005 of the address electrode 4004. As a result, incident light is reflected from the mirror 4007 to a direction away from the projection optical path. FIG. 10B shows the change of the intensity of the reflection light to the projection optics when the mirror 4007 is controlled to operate in the OFF state.

To control the oscillation of the mirror 4007, a signal (0,0) is applied to the pixel element when the mirror 4007 is in the OFF state. Specifically, the voltage of 0[V] is applied to both of the address electrodes 4004 and 4003 as exemplified in FIG. 11A and that terminates the coulomb force applied between the mirror 4007 and the address electrode 4004. The mirror 4007 starts to oscillate freely because the elastic hinge 4006 applies an elastic spring force to the mirror 4007. The incident light is reflected by the mirror 4007 while oscillating between the projection optical path and a direction away from the projection optical path. Additionally, the oscillation of the mirror 4007 can be controlled by simultaneously terminating the voltages applies to the address electrodes when the mirror 4007 in the ON state. FIG. 11B shows the change of the intensity of reflection light to the projection optics when the oscillation of the mirror 4007 is controlled during a predetermined duration from the OFF state. It can be easily understood from this state that the intensity of reflection light to the projection optics per unit time decreases.

Figures 12A, 12B:
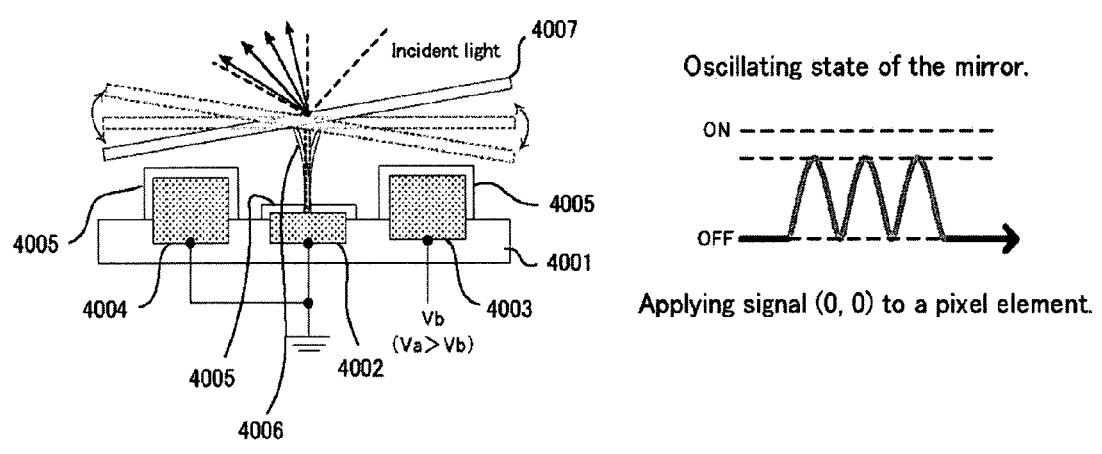
FIG. 12A is a second schematic showing the oscillation state of a mirror in a pixel element.
FIG. 12B is a second schematic showing the state of a change in the quantity of reflection light to the projection optics when the oscillation of the mirror is controlled.

FIG. 12A shows the operation of the mirror 4007 when the voltage applied to the address electrode 4004 is set not to 0[V] but to a voltage $V_b[V]$ to operate the mirror in the oscillation state that is different from the oscillation operation described with reference to FIGS. 11A and 11B. The voltage $V_b[V]$ is a voltage lower than $V_a[V]$, and $V_b[V]$ has a lower voltage value below a voltage for holding the mirror 4007 to stay at the OFF direction. However, because a lower voltage is applied to the address electrode 4004, the mirror 4007 does not deflect completely by the elastic spring force of the hinge to the angle of the ON-state direction. The mirror oscillates in a reduced angular range according to the applied voltage $V_b[V]$. FIG. 12b is a timing diagram for showing the change of the intensity of reflection light to the projection optics when the oscillation operation of the mirror 4007 is oscillated in the reduced angular range. By applying this control method, the intensity of reflection light projected to the projection optics can be flexibly adjusted in the oscillation state per unit time.

The method described above that applies a reduced voltage to an address electrode to control the oscillation state of the pixel element may be implemented to either of the two deflection states such as the ON and the OFF states. The method can be alternately applied by applying pulse width modulation using the ON and the OFF states combined with the control of the mirror oscillation with reduced voltages applied to the electrodes to oscillate with a reduced angular range.

Additionally, in the above described preferred embodiments, the relational equations (4) and (6) may be applied to control the color sequential display of $C_0$ colors particularly when a color image display is implemented with a gray scale display control with image data of 10 [bits] or more for each color.

Furthermore, in the above-described preferred embodiments, the micromirror device can be also configured to comprise pixel elements of 1920×1080 [pixels] or more. In this case, the cross-sectional area of a ROW line may be equal to or larger than $6.1*10^{-15}$ [m²]. Moreover, in this case, the electrical resistivity (Q) of the material of a ROW line may be equal to or smaller than $2.65*10^{-15}$ [Ωm].

Still further, in the above-described preferred embodiments, the micromirror device can be also configured so that the pitch or the size of a mirror is equal to or larger than 4 [um] and equal to or smaller than 10 [um]. In this case, the cross-sectional area of a ROW line may be equal to or larger than $3.9*10^{-15}$ [m$^2$]. Moreover, in this case, the electrical resistivity (Q) of the material of a ROW line may be equal to or smaller than $1.68*10^{-8}$ [Ωm].

Still further, in the above-described preferred embodiments, the micromirror device can be also configured so that the relative permittivity ($\in_r$) of the inter-layer dielectric film of a ROW line is equal to or smaller than 3.8 [F/m].

Still further, in the above-described preferred embodiments, the relational equations (4) and (6) can be also represented as the following relational equation (8) if a gray scale display of $G_s$ [bits] for each color is made with a color sequential display of $C_0$ colors. Note that B represents the number of subsets in these equations. For example, the relational equation (4) can be represented as the relational equation (8) in the case of B=1.

$$R*(C_t+C)<B*[60*C_o*(2^{G_s}-1)*M_s*N_s*(M_s+1)]^{-1} \quad (8)$$

Still further, the relational equation (1) described in the first preferred embodiment can be also represented as the following relational equation (9) in the second preferred embodiment.

$$\tau>[R*(C_t+C)*M_s*(M_s+1)*N_s] \quad (9)$$

Still further, according to the relational equation (1) described in the first preferred embodiment, the total value of the propagation delay time of a ROW line 1009 is smaller than the driving interval of the ROW line 1009 driven in the minimum display duration τ of the micromirror device 1001. The ROW line 1009 connects to all of FET transistors 1105 of memory cells 1007 arranged successively in the ROW direction for controlling the switching time of each FET transistor 1105. In this case, the switching time of an FET transistor 1105 is the total value of the turn-on time and the turn-off time of the FET transistor 1105. Moreover, the minimum display duration τ is a display duration corresponding to the LSB (Least Significant Bit) in the gray scale of the micromirror device 1001.

Still further, according to the relational equation (6) as that described in the second preferred embodiment, the total value of the propagation delay time of a ROW line 1009 is smaller than the driving interval of the ROW line 1009 driven in the minimum display duration τ of the micromirror device 2001. The ROW line 1009 connects all of FET transistors 1105 of memory cells 1007 arranged successively in the ROW direction for controlling the switching time of each FET transistor 1105 in each subset 2002. In this case, the switching time of an FET transistor is the total value of the turn-on time and the turn-off time of the FET transistor. Moreover, the minimum display duration τ is a display duration corresponding to the LSB (Least Significant Bit) in the gray scale of the micromirror device 2001.

Still further, in the first preferred embodiment, the voltage on the ROW line 1009 drops when applying a voltage higher than the gate threshold voltage of an FET transistor 1105 to the gate terminals of all of FET transistors 1105 in the ROW line 1009. In contrast, the voltage on the COLUMN line 1008 drops when applying a voltage equal to or higher than the driving voltage of a mirror 1102 to the source nodes of all of FET transistors 1105 in the COLUMN line 1008.

Still further, in the first preferred embodiment, the image data is loaded with a voltage that is able to continuously hold the pixel element 1101 on a deflection state over the maximum display duration of the micromirror device 1001 in all of FET transistors connected to each ROW line 1009.

Still further, in the second preferred embodiment, the image data is loaded with a voltage that is able to continuously hold the pixel element on a deflection state over the maximum display duration of the micromirror device 2001 in all of FET transistors connected to each ROW line 1009 in each subset 2002.

Still further, in the first and the second preferred embodiments, the image data is loaded in a time interval when the voltage is applied to an electrode connected to each FET transistor 1105 to hold the deflection state of a pixel element 1101. The time interval for controlling and holding the deflection state is the display duration or longer corresponds to the MSB (Most Significant Bit) in a control word for controlling the gray scale of the micromirror device 1001. Moreover, the interval for loading the image data is longer than the oscillation period of one oscillation of a mirror 1102.

Up to this point, the present invention has been described in detail. The present invention is not limited to the above-described preferred embodiments, and various improvements and modifications can be made within the scope that does not depart from the gist of the present invention as a matter of course.

As described above, according to the present invention, the wiring resistance and the wiring capacity of a ROW line, and the input gate capacity of an FET transistor are specifically designed and processed as to satisfy the above described relational equations (1) and (4) in the wiring design of each memory cell and ROW line in a micromirror device, whereby a desired display gray scan can be achieved in the micromirror device having a desired resolution.

Additionally, according to the present invention, a micromirror device is configured so that a pixel element array is partitioned into a plurality of subsets, and data is concurrently loaded into the subsets, whereby a time required to drive each ROW line can be moderated.

Furthermore, according to the present invention, the control of an oscillation state is applied to a pixel element array, whereby a driving time required per ROW line can be moderated.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A micromirror device for applying a digital image data to display an image comprising:
   a plurality of pixel elements arranged in a form of an array and grouped into B subsets each including pixel elements configured as $M_s$ columns and $N_s$ rows represented by $M_s$ (COLUMNs)×$N_s$ (ROWs) wherein $M_s$, $N_s$ and B are positive integers;
   each of said pixel elements has a mirror, and at least one memory cell to pulse width modulate (PWM) an incident light;
   the memory cell has a transistor of an input gate capacity $C_t$ [F];
   each memory cell is connected by a ROW line having a wiring resistance R[106], and a wiring capacity C[F]; and wherein the parameters represented by
   $M_s$, $N_s$, B, $C_t$, R, C, and a number of colors represented by $C_0$ have a relationship of $R*(C_t+C)<(1.63*10^{-5}*B)/[C_o*M_s*N_s*(M_s+1)]$, when a gray scale display of 10 bits or more for each color is presented with a color sequential display of $C_0$ colors.

2. The micromirror device according to claim 1, comprising:
said array of said pixel elements of comprising an array of 1920×1080 pixel elements or more wherein a pitch of the mirror is equal to or larger than 4 um, and equal to or smaller than 10 um.

3. The micromirror device according to claim 2, wherein: a cross-sectional area of the ROW line is equal to or larger than $6.1*10^{-15}$ m².

4. The micromirror device according to claim 2, wherein: an electrical resistivity ($\rho$) of a material of the ROW line is equal to or smaller than $2.65*10^{-8}$ $\Omega$m.

5. The micromirror device according to claim 2, wherein a cross-sectional area of the ROW line is equal to or larger than $3.9*10^{-15}$ m².

6. The micromirror device according to claim 2, wherein: an electrical resistivity ($\rho$) of a material of the ROW line is equal to or smaller than $1.68*10^{-8}$ $\Omega$m.

7. The micromirror device according to claim 1, wherein: a relative permittivity ($\in_r$) of an inter-layer dielectric film of the ROW line is equal to or smaller than 3.8 F/m.

8. The micromirror device according to claim 1, wherein: the mirror of each of said pixel elements is controllable to deflect to an ON deflection angle for reflecting an incident light to projection optics, an OFF deflection angle for reflecting the incident light to a direction away from the projection optics, and an oscillation state with the mirror oscillates between the ON and the OFF deflection angles.

9. A micromirror device for applying a digital image data to display an image, comprising:
a plurality of pixel elements arranged in a form of an array and grouped into B subsets each including pixel elements configured as $M_s$ columns and $N_s$ rows represented by $M_s$(COLUMNs)×$N_s$(ROWs) wherein-$M_s$, $N_s$ and B are positive integers);
each of said pixel elements has a mirror, and at least one memory cell to pulse width modulate (PWM) an incident light;
the memory cell has a transistor of an input gate capacity $C_t$[F];
each memory cell is connected by a ROW line having a wiring resistance R[$\Omega$], and a wiring capacity C[F]; and wherein the parameters represented by
$M_s$, $N_s$, B, $C_t$, R, C, and a number of colors represented by $C_O$, and a number of gray scales represented by a bit number $G_s$ have a relationship of $R*(C_t+C)<B*[60*C_o*(2^{Gs}-1)*M_s*N_s*(M_s+1)]^{-1}$, when a gray scale display of $G_s$ [bits] for each color is presented with a color sequential display of $C_0$ colors.

10. The micromirror device according to claim 9, comprising:
said array of said pixel elements comprising an array of 1920×1080 pixel elements or more wherein a pitch of the mirror is equal to or larger than 4 um, and equal to or smaller than 10 um.

11. The micromirror device according to claim 9, wherein: a wiring material of the ROW line is composed of a material selected from a group of materials consisted of Al, Cu, Au, and Ag, or an alloy containing one of the materials.

12. The micromirror device according to claim 9, wherein: an inter-layer dielectric film of the ROW line contains one of a materials selected from a group of materials consisted of $SiO_2$, SiC, SiOC, and SiOF.

13. The micromirror device according to claim 9, wherein: an inter-layer dielectric film of the ROW line is doped with a dopant selected from fluorine (F) or carbon (C).

14. The micromirror device according to claim 9, wherein: the mirror of each of said pixel elements is controllable to deflect to an ON deflection angle for reflecting an incident light to projection optics, an OFF deflection angle for reflecting the incident light to a direction away from the projection optics, and an oscillation state with the mirror oscillates between the ON and the OFF deflection angles.

15. A micromirror device for applying a digital image data to display an image comprising:
a plurality of pixel elements arranged in a form of an array and grouped into B subsets each including pixel elements configured as $M_s$ columns and $N_s$ rows represented by $M_s$(COLUMNs)×$N_s$(ROWs) wherein-$M_s$, $N_s$ and B are positive integers;
each of said pixel elements has a mirror, and at least one memory cell to pulse width modulate (PWM) an incident light;
the memory cell has a transistor of an input gate capacity $C_t$[F];
the memory cell has a transistor of an input gate capacity $C_t$[F];
each memory cell is connected by a ROW line having a wiring resistance R[$\Omega$], and a wiring capacity C[F]; and wherein the parameters represented by
$M_s$, $N_s$, $C_t$, R, and C have a relationship of $\tau>[R*(C_t+C)*M_s*(M_s+1)*N_s]$, for a minimum display duration $\tau$(sec) of each of said pixel elements for the digital image data.

16. The micromirror device according to claim 15, wherein:
the minimum display duration is a duration modulated by applying a least significant bit (LSB) of the digital image data to control the micromirror device.

17. The micromirror device according to claim 15, comprising:
said array of said pixel elements comprising an array of 1920×1080 pixel elements or more wherein a pitch of the mirror is equal to or larger than 4 um, and equal to or smaller than 10 um.

18. The micromirror device according to claim 15, wherein:
a wiring material of the ROW line is composed of a material selected from a group of materials consisted of Al, Cu, Au, and Ag, or an alloy containing one of the materials.

19. The micromirror device according to claim 15, wherein:
an inter-layer dielectric film of the ROW line contains one of a materials selected from a group of materials consisted of $SiO_2$, SiC, SiOC, and SiOF.

20. The micromirror device according to claim 15, wherein:
an inter-layer dielectric film of the ROW line is doped with a dopant selected from fluorine (F) or carbon (C).

21. The micromirror device according to claim 15, further comprising:
at least one ROW line decoder for non-sequentially selecting and driving a ROW line; and at least one COLUMN line driver for loading the image data into the memory cell in the pixel element on the selected ROW line via a COLUMN line.

22. The micromirror device according to claim 15, wherein:
- a first ROW line decoder and a first COLUMN line driver are connected to a first subset as one of said B subsets of pixel elements,
- a second ROW line decoder and a second COLUMN line driver are connected to a second subset as another of said B subsets of pixel elements, and
- the first and the second subsets are individually controlled for independently loading the image data.

23. The micromirror device according to claim 15, comprising:
- a data selector for distributing bits of the image data in different order for each of the plurality of subsets.

24. The micromirror device according to claim 15, wherein:
- the mirror of each of said pixel elements is controllable to deflect to an ON deflection angle for reflecting an incident light to projection optics, an OFF deflection angle for reflecting the incident light to a direction away from the projection optics, and an oscillation state with the mirror oscillates between the ON and the OFF deflection angles.

* * * * *